United States Patent
Cardwell, Jr. et al.

(10) Patent No.: US 6,181,585 B1
(45) Date of Patent: Jan. 30, 2001

(54) MULTIPLE OUTPUT POWER SUPPLY CIRCUIT FOR AN ION ENGINE WITH SHARED UPPER INVERTER

(75) Inventors: Gilbert I. Cardwell, Jr., Palos Verdes Peninsula; Thomas K. Phelps, Torrance, both of CA (US)

(73) Assignee: Hughes Electronics Corporation, El Segundo, CA (US)

( * ) Notice: Under 35 U.S.C. 154(b), the term of this patent shall be extended for 0 days.

(21) Appl. No.: 09/351,738

(22) Filed: Jul. 12, 1999

(51) Int. Cl.⁷ .................................................. H02M 3/335
(52) U.S. Cl. ................... 363/71; 363/17; 363/132
(58) Field of Search .................. 363/17, 71, 132

(56) References Cited

U.S. PATENT DOCUMENTS

| | | | |
|---|---|---|---|
| 3,491,250 | * | 1/1970 | Shoh ........................................ 363/71 |
| 4,533,836 | * | 8/1985 | Carpenter et al. ..................... 363/17 |
| 4,695,933 | * | 9/1987 | Nguyen et al. ......................... 363/71 |
| 4,825,646 | | 5/1989 | Challoner et al. ..................... 60/202 |
| 5,269,131 | | 12/1993 | Brophy .................................... 60/202 |
| 5,369,953 | | 12/1994 | Brophy .................................... 60/202 |
| 5,434,770 | * | 7/1995 | DreiFuerst et al. ................... 363/71 |
| 5,451,962 | * | 9/1995 | Steigerwald ............................ 363/17 |
| 5,576,940 | * | 11/1996 | Steigerwald et al. .................. 363/17 |
| 5,610,452 | | 3/1997 | Shimer et al. ......................... 307/89 |
| 5,657,217 | | 8/1997 | Watanabe et al. ..................... 363/71 |
| 5,666,278 | | 9/1997 | Ng et al. ................................. 363/71 |
| 5,852,555 | | 12/1998 | Martin .................................... 363/71 |
| 5,862,041 | | 1/1999 | Martin .................................... 363/71 |
| 5,862,042 | * | 1/1999 | Jiang ....................................... 363/17 |
| 5,875,103 | * | 2/1999 | Bhagwat et al. ....................... 363/71 |
| 5,923,549 | * | 7/1999 | Kobayashi et al. .................... 363/17 |
| 5,930,122 | * | 7/1999 | Moriguchi et al. .................... 363/17 |
| 5,949,668 | | 9/1999 | Schweighofer ........................ 363/71 |
| 5,991,179 | | 11/1999 | Schweighofer ........................ 363/71 |

OTHER PUBLICATIONS

Thomas A. Bond et al., "NSTAR Ion Engine Power Processor Unit Performance: Ground Test and Flight Experience", SAE Paper 99APSC–47, Apr. 1999.

Thomas A. Bond et al., "The NSTAR Ion Propulsion Subsystem for DS1", AIAA Joint Propulsion Conference, AIAA Paper 99–2972, Jun. 23, 1999.

John A. Hamley et al., "The Design and Performance Characteristics of the NSTAR PPU and DCIU", AIAA/ASME/SAE/ASEE Joint Propulsion Conference & Exhibit, $34^{th}$ , Cleveland, OH, Jul. 13–15, 1998, AIAA Paper 98–3938.

* cited by examiner

Primary Examiner—Jeffrey Sterrett
(74) Attorney, Agent, or Firm—Terje Gudmestad

(57) ABSTRACT

A power supply circuit for an ion engine suitable for a spacecraft is coupled to a bus having a bus input and a bus return. The power supply circuit has a first primary winding of a first transformer. An upper inverter circuit is coupled to the bus input and the first primary winding. The power supply circuit further includes a first lower inverter circuit coupled to the bus return and the first primary winding. The second primary winding of a second transformer is coupled to the upper inverter circuit. A second lower inverter circuit is coupled to the bus return and the second primary winding.

10 Claims, 3 Drawing Sheets

MULTIPLE OUTPUT POWER SUPPLY CIRCUIT FOR AN ION ENGINE WITH SHARED UPPER INVERTER

The invention described herein was made in the performance of work under NASA Contract Number NAS3-27560 and is subject to the provisions of Section 305 of the National Aeronautics and Space Act of 1958 (72 Stat. 435; 42U.S. C 2457).

TECHNICAL FIELD

The present invention relates generally to an ion propulsion system, and in particular to a method and apparatus for supplying electrical power to an ion engine.

BACKGROUND OF THE INVENTION

For over thirty years, ion engines have been proposed for propulsion of vehicles in space. Outside of space propulsion, ion generation may also be applied to various types of materials processing systems involving ion sources, such as for ion beam etching or micromachining. Ion engines use movement of ions to provide thrust.

Generally, an ion engine has an ion accelerator system that uses an anode, a cathode, a screen grid and an accelerator grid coupled within a thruster housing. Generally, an ion engine works by generating an inert gas plasma within the thruster housing. Xenon is an example of a suitable gas. A charge within the plasma between the anode and cathode forms ions. The inert gas ions leave the thruster through the charged screen and accelerator. The net force from the ions leaving the thruster housing generates a thrust. A neutralizer is located outside the thruster housing and generates electrons. The electrons are attracted to the ions so the ions do not re-enter the thruster housing as they otherwise would in space.

A number of power supplies are used to power the various components of the system. Heaters, the accelerator, the screen, the anode and cathode of the thruster, and the anode and cathode of the neutralizer each have separate power supplies. The power supply for the screen processes a majority of the power of the spacecraft. The anode and cathode of the thruster also a substantial amount of power. The remaining four power supplies use a relatively little amount of power (less than 100 Watts).

Although the four power supplies use little power they account for a significant amount of parts and complexity. In spacecraft design, it is desirable to eliminate parts and complexity when possible. More parts increases weight of the spacecraft. More parts and complexity inherently reduces reliability.

It is therefore an object of the invention to provide a power supply system that operates reliably while maintaining good efficiency over the dynamic range.

SUMMARY OF THE INVENTION

It is therefore one object of the invention to provide a power supply system that operates reliably over a wide dynamic range. It is a further object of the invention to provide a module that is capable of operating at lower power and lower stress levels as well as higher power and high stress levels and that spreads power distribution over a large area to reduce stress.

In one aspect of the invention, a power supply circuit for an ion engine suitable for a spacecraft is coupled to a bus having a bus input and a bus return. The power supply circuit has a first primary winding of a first transformer. An upper inverter circuit is coupled to the bus input and the first primary winding. The power supply circuit further includes a first lower inverter circuit coupled to the bus return and the first primary winding. The second primary winding of a second transformer is coupled to the upper inverter circuit. A second lower inverter circuit is coupled to the bus return and the second primary winding.

In a further aspect of the invention, a method for controlling a power supply circuit having an upper inverter circuit, a first lower inverter circuit, and a second lower inverter circuit, said first lower inverter circuit and said second lower inverter circuit coupled to the upper inverter circuit, the method comprising the steps of:

controlling a first lower inverter circuit using a first output signal of a pulse width modulating circuit, said first output signal having a first duty cycle;

increasing the first duty cycle to attain a first predetermined voltage;

controlling a second lower inverter circuit using a second output signal of a pulse width modulating circuit, said second output signal having a second duty cycle; and increasing the second duty cycle to attain a second predetermined voltage independent of the first predetermined voltage.

One advantage of the invention is that independent control of the individual power supplies is maintained. This has been achieved using a reduce part count.

Other features and advantages of the invention are readily apparent from the following detailed description of carrying out the invention when taken in connection with the accompanying drawings.

DESCRIPTION OF THE PREFERRED EMBODIMENTS

Figure 1:
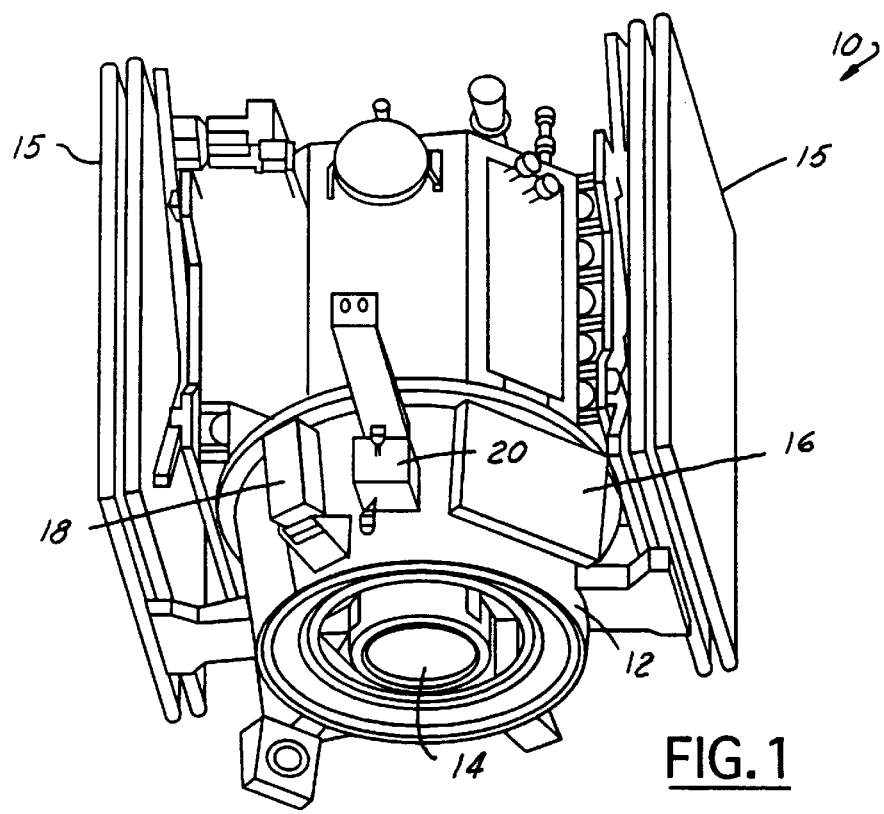
FIG. 1 is a perspective view of a spacecraft having a power supply circuit according to the present invention.
Figure 2:
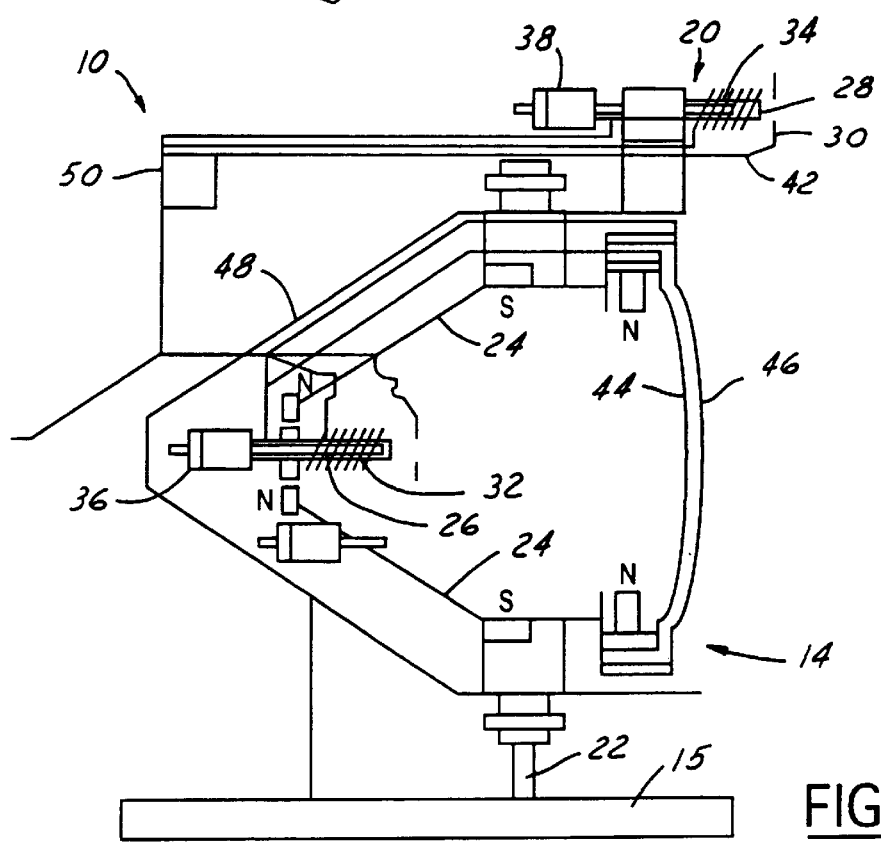
FIG. 2 is a cross sectional view of an ion thruster having a power supply according to the present invention.

In the following description, identical reference numerals are used to identify identical components in the various figures. The present invention is particularly suitable for use in a spacecraft. The power supply circuit of the present invention is also useful in other applications that have a wide dynamic range of system operability including a varying load or input. The present invention is also applicable to other systems that include ion sources such as materials processing equipment like ion beam etching or micromachining.

Referring now to FIG. 1, a spacecraft 10 has a thruster housing 12 that houses an ion thruster 14. Spacecraft 10 further includes solar panels 15 as a source of electrical power. In the present invention, spacecraft 10 is powered by xenon ions which are generated in ion thruster 14. Spacecraft 10 includes a xenon feed subsystem 16 supplying xenon to thruster 14. A digital interface and control unit (DCIU)18 is also coupled to the thruster housing 12.

A neutralizer 20 is also coupled to thruster housing 12 and xenon feed subsystem 16. As will be further described below, neutralizer 20 generates electrons to neutralize the positive ions emitted by thruster 14.

Thruster 14 generally includes an anode 24 and a cathode 26. Neutralizer 20 also includes an a node 28 and a cathode 30. Cathodes 26, 30 each have a respective heater 32, 34. Thruster 14 and neutralizer 20 also include a respective xenon source 36, 38 that are part of xenon feed subsystem 16. A keeper 40, 42 for concentrating the stream of xenon (ions or electrons) may also be provided near respective cathodes 26, 30.

Thruster 14 further includes a screen grid 44 and an accelerator grid 46. Both screen grid 44 and accelerator grid 46 are formed of an electrically conductive mesh material.

A plasma screen 48 may be used to enclose thruster 14 on sides other than where screen 44 and accelerator 46 are positioned. Plasma screen 48 is used to capture and prevent spalling of ion sputtered grid material.

A power supply circuit 50 is incorporated into spacecraft circuitry. Power supply circuitry 50 is coupled to anodes 24, 28, cathodes 26, 30, heaters 32, 34, screen grid 44 and accelerator 46.

Figure 3:
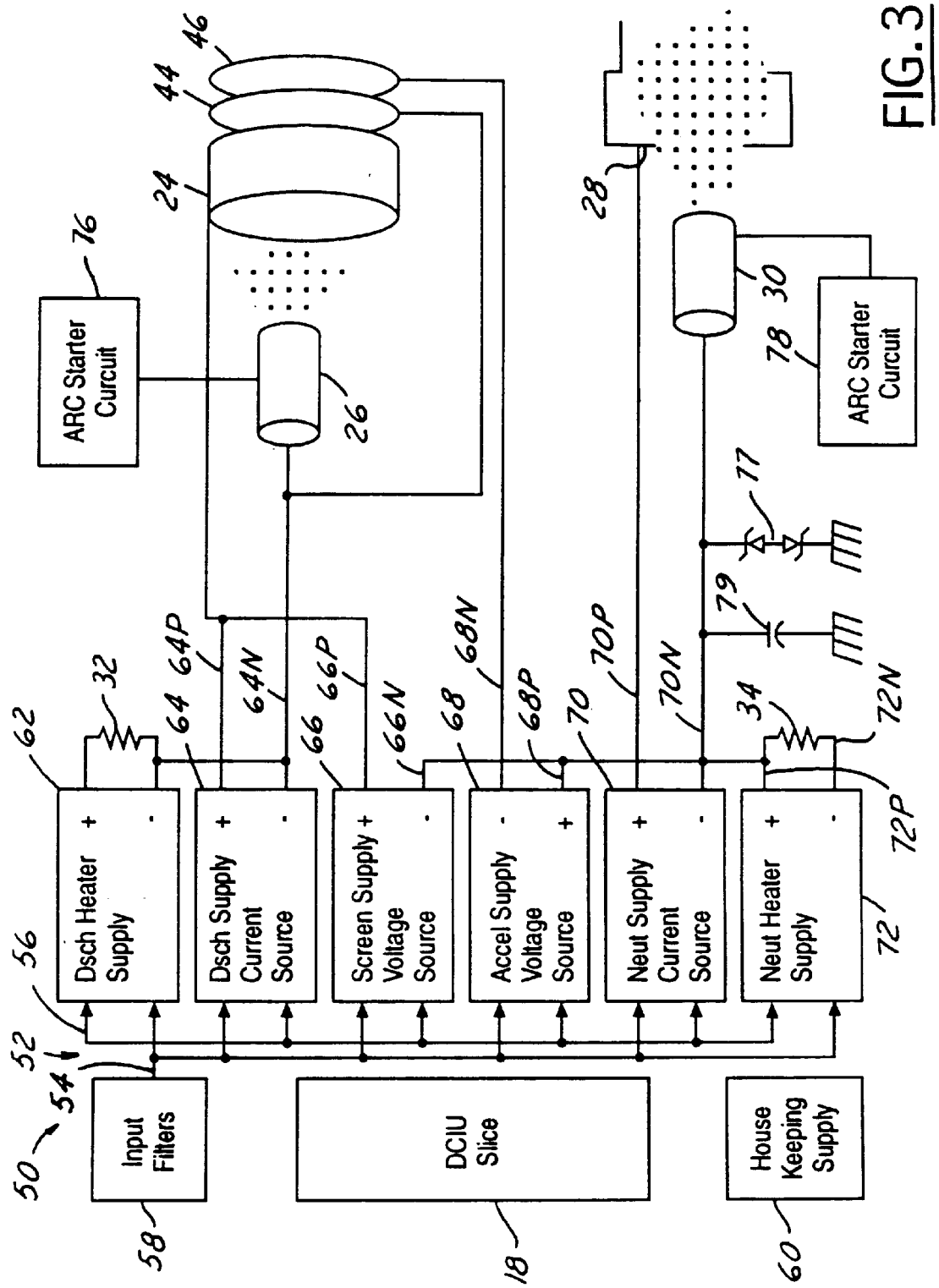
FIG. 3 is a block diagram of a power supply system according to the present invention.

At a high level of operation, xenon sources 36, 38 are used to generate a plasma of xenon adjacent to cathodes 26, 30, respectively. Heaters 32, 34 are used to heat the xenon plasma upon start up. An arc starter circuit shown in FIG. 3 is used to ignite the xenon plasma. Thruster 14 uses the xenon ions for thrust. As the xenon ions pass through screen 44 and accelerator grid 46, thrust is created. Neutralizer 20 generates a xenon plasma as well. However, the goal of neutralizer 20 is to generate electrons that are used to electrically balance the xenon positive ions in space to prevent the xenon ions from being attracted back to the spacecraft.

Referring now to FIG. 3, power supply circuit 50 is illustrated in greater detail. A central spacecraft bus 52 couples the base components of power supply circuit 50 together. Spacecraft bus 52 includes a bus input 54 and a bus return 56.

Input filters 58 may be coupled to spacecraft bus 52 to reduce electrical noise. Input filters 58 may take the form of capacitors or other circuit components as would be evident to those skilled in the art.

The control of the power supply circuit 50 is controlled by DCIU 18. DCIU 18 is also coupled to bus 52. A housekeeping supply 60 may also be incorporated into power supply circuit 50. Housekeeping supply 60 may be used for other functions besides a centralized system and may not be coupled to bus 52.

Power supply circuit 50 includes a plurality of application specific power supplies. The application specific power supplies are sized in terms of current and voltage based on the specific components to which they are connected. The specific power supplies may include a discharge heater supply 62, discharge supply current source 64, screen supply voltage source 66, an accelerator supply voltage source 68, a neutralizer supply current source 70, and a neutralizer heater supply 72. Discharge heater supply 62 is coupled to heater 32 and is disposed within thruster 14. Discharge supply current source 64 has a positive output 64P coupled to anode 24. Discharge supply current source 64 also has a negative output coupled to cathode 26. Negative output may also be coupled to screen grid 44. Screen supply voltage source 66 has a positive output 66P that may also be coupled to anode 24. Accelerator supply voltage source 68 has a negative terminal coupled to accelerator 46. Neutralizer supply current source 70 has a positive output 70P coupled to neutralizer anode 28. Neutralizer supply current source has a negative output 70N coupled to neutralizer cathode 30. A filter capacitor 79 and a voltage clamp 77 may be coupled to negative output 77 of neutralizer supply 70. Neutralizer heater supply 72 is coupled to heater 34. Neutralizer heater supply 72 has a positive output 70P and a negative output 70N.

A negative output 66N of screen supply voltage source 66, a positive output 68P of accelerator supply voltage source 68, a negative output 70N of neutralizer supply current source 70 and negative output 72N of neutralizer heater supply 72 may all be coupled together at the same electrical potential. Discharge arc starter circuit 76 and a neutralizer arc starter circuit 78 may be coupled to cathodes 26, 30 respectively. As described above, arc starter circuits 76, 78 are used to ignite the ion plasma.

Figure 4:
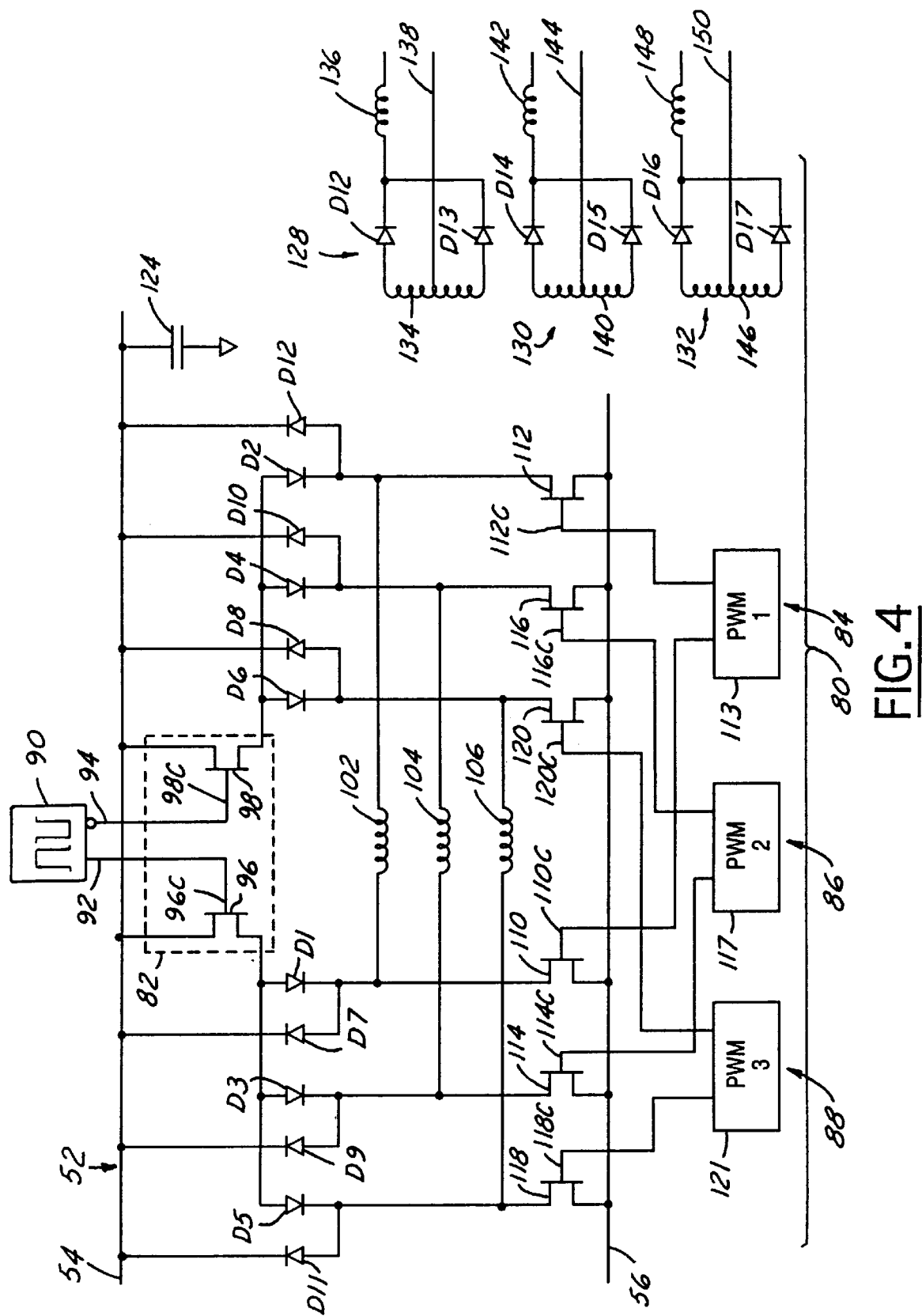
FIG. 4 is an inverter circuit used in for some of the supply module.

Referring now to FIG. 4, power supply circuit 80 according to the present invention shown. As illustrated, power supply circuit 80 serves three circuits. However, various numbers of circuits may be interconnected according to the teachings of the present invention. This embodiment may, for example, correspond with the discharge heater supply 62, the accelerator supply voltage source 68, the neutral supply current source 70 or and/or the neutral heater supply 72 of FIG. 3. As will be further described below, each circuit shares a common upper inverter circuit 82 with separate lower inverter circuits 84, 86 and 88 to form independent controlled power supplies.

Upper inverter circuit 82 is coupled to a squarewave generator 90. Squarewave generator 90 has a squarewave output 92 and an inverting output 94.

Upper inverter circuit 82 is comprised of a first switch 96 and a second switch 98. The first switch 96 and second switch 98 are coupled to bus input 54. Each switch has a respective control terminals 96c, 98c. Control terminals 96c, 98c are coupled respectively to squarewave output 92 and inverting output 94 of squarewave generator 90. Because inverting output 94 and squarewave output 92 are fifty percent duty cycle signals, 180° out of phase, switch 96 is conducting while second switch 98 is non-conducting, and vice versa.

Upper inverter circuit 82 is coupled to the primary windings 102, 104, 106 of each lower inverter circuits 84, 86, 88. First switch 96 and second switch 98 are coupled to primary winding 102 through isolation diodes D1 and D2 respectively. First switch 96 and second switch 98 are coupled to primary winding 104 through respective isolation diodes D3 and D4. First switch 96 and second switch 98 are coupled to primary winding 106 through respective isolation diodes D5 and D6.

Further isolation diodes D7 through D12 are provided between primary windings 102, 104, and 106 and bus input 54. Isolation diodes D7 and D8 are coupled between primary winding 102 and bus input 54. Isolation diodes D9 and D10 are coupled between primary winding 104 and bus input 54. Isolation diodes D11 and D12 are provided between primary winding 106 and bus input 54.

Lower inverter circuit 84 has a third switch 110 and a fourth switch 112. Each switch 110, 112 is coupled between primary winding 102 and bus return 56. Third switch 110 and fourth switch 112 have a respective control terminal 110c and 112c. Control terminals 110c and 112c are coupled to pulse width modulator 113.

Lower inverter circuit 86 has a third switch 114 and a fourth switch 116 that are coupled between primary winding 104 and bus return 56. Switch 114 and 116 have respective control terminals 114*c* and 116*c*. Control terminals 114*c* and 116*c* are coupled to pulse width modulator 117.

Lower inverter circuit 88 has a third switch 118 and fourth switch 120 coupled between primary winding 106 and bus return 56. Third switch 118 and fourth switch 120 have respective control terminals 118*c* and 120*c*. Control terminals 118*c* and 120*c* are coupled to pulse width modulator 121.

Bus input 54 may have a filtering capacitor 124 coupled thereto. Filtering capacitor 124 may be used to provide noise filtering on bus 52.

Each lower inverter circuit 84, 86, and 88 has a respective secondary circuit 128, 130 and 132. Each secondary circuit 128–132 may be similarly configured. Secondary circuit 128 has a secondary winding 134, each end of which is coupled to a respective rectifying diode D12 and D13. Diodes D12 and D13 are coupled to a smoothing inductor 136. Secondary winding 134 may also include a tap 138.

Secondary circuit 130 has a secondary winding 140, each end of which is coupled to rectifying diodes D14 and D15. Diodes D14 and D15 may each be coupled to a smoothing inductor 142. Secondary winding 140 may also have a tap 144 extending therefrom.

Secondary circuit 132 may include a secondary winding 146, each end of which is coupled to rectifying diodes D16 and D17. Each diode D16, D17 may be coupled to a smoothing inductor 148. Secondary winding 146 may also have a tap 150 coupled to secondary winding 146.

In operation, each primary transformer 102, 104 and 106 sees only the pulse width modulated waveforms generated by its respective third and fourth switch. Therefore, the output of secondary circuits 128, 130 and 132 are each independent of the other. In this embodiment, two sets of upper inverter circuits have been eliminated from the spacecraft without losing functionality or independent control.

The operation of upper inverting circuit 82 and one lower inverter circuit 84 will be described. However, each of the other lower inverter circuits 86, 88 operate in a similar manner.

The first switch 96 and second switch 98 of upper inverting circuit 82 are alternately conducting using an 180° out of phase, 50% duty cycle from squarewave generator. First switch 96 and second switch 98 are controlled by two signals that are inverted from each other to provide the nonconducting and conducting states.

At the same time, third switch 110 and fourth switch 112 are supplied with a pulse width modulated signal from pulse width modulator 113. The pulse width modulator 113 adjusts the duty cycle of the control signals to third switch 110 and fourth switch 112 so that the desired amount of energy transfer to transformer 102 may be achieved. By changing the respective duty cycles, the voltage across primary winding 102 may be adjusted and, thus, the output of secondary circuit 128 may also be adjusted.

In an extreme case, if switch 96 is conducting at the same time switch 112 is conducting while switches 98 and 110 are non-conducting, full bus voltage is applied across primary winding 102. By reducing the duty cycle, the voltage across primary winding 102 is decreased.

While the best modes for carrying out the invention have been described in detail, those familiar with the art to which this invention relates will recognize various alternative designs and embodiments for practicing the invention as defined by the following claims.

What is claimed is:

1. A power supply circuit coupled to a bus having a bus input and a bus return comprising:

a square wave generator generating a first square wave signal and a second square wave signal, said first square wave signal and said second square wave signal are 180 degrees out of phase:

a first primary winding of a first transformer having a first end and a second end;

a first pulse width modulator;

an upper inverter circuit coupled to said bus input and the first primary winding, said upper inverter circuit comprises a first switch coupled to said first end and a second switch coupled to said second end, said upper inverter circuit alternatively coupling said first end and said second end of said first primary winding to said bus input, said first switch and said second switch having a respective first control input and a second control input respectively coupled to said first square wave signal and said second square wave signal;

a second pulse width modulator;

a first lower inverter circuit coupled to said bus return and said first primary winding, said first lower inverter circuit comprises a third switch coupled to said first end and a fourth switch coupled to said second end, said third switch and said fourth switch selectively coupling said first primary winding to said bus return, said third switch and said fourth switch having a respective third control input and a fourth control input coupled to said first pulse width modulator;

a second primary winding of a second transformer coupled to said upper inverter circuit, said second primary winding is electrically isolated from the first primary winding, said second primary winding having a third end coupled to said first switch and a fourth end coupled to said second switch; and a second lower inverter circuit coupled to said bus return and said second primary winding, said second lower inverter circuit comprises a fifth switch coupled to said third end and a sixth switch coupled to said fourth end, said fifth switch and said sixth switch selectively coupling said second primary winding to said bus return, said fifth switch and said sixth switch having a respective fifth control input and a sixth control input coupled to said second pulse width modulator.

2. A power supply circuit as recited in claim 1 further comprising a first diode coupled between said first end and said first switch, a second diode coupled between said first end and said bus, a third diode coupled between said second end and said second switch, and a fourth diode coupled between said second end and said bus.

3. A spacecraft comprising:

a spacecraft housing;

a voltage bus having an input line and a return line;

a power supply circuit comprising, a square wave generator generating a first square wave signal and a second square wave signal, said first square wave signal and said second square wave signal are 180 degrees out of phase;

a first primary winding of a first transformer having a first end and a second end;

a first pulse width modulator;

an upper inverter circuit coupled to said bus input and the first primary winding, said upper inverter circuit comprises a first switch coupled to said first end and a second switch coupled to said second end, said upper inverter circuit alternatively coupling said first end and said second end of said first primary winding to said bus input, said first switch and said second switch having a respective first control input and a second control input respectively coupled to said first square wave signal and said second square wave signal;

a second pulse width modulator;

a first lower inverter circuit coupled to said bus return and said first primary winding, said first lower inverter circuit comprises a third switch coupled to said first end and a fourth switch coupled to said second end, said third switch and said fourth switch selectively coupling said first primary winding to said bus return, said third switch and said fourth switch having a respective third control input and a fourth control input coupled to said first pulse width modulator;

a second primary winding of a second transformer coupled to said upper inverter circuit, said second primary winding is electrically isolated from the first primary winding, said second primary winding having a third end coupled to said first switch and a fourth end coupled to said second switch; and a second lower inverter circuit coupled to said bus return and said second primary winding, said second lower inverter circuit comprises a fifth switch coupled to said third end and a sixth switch coupled to said fourth end, said fifth switch and said sixth switch selectively coupling said second primary winding to said bus return, said fifth switch and said sixth switch having a respective fifth control input and a sixth control input coupled to said second pulse width modulator.

4. A spacecraft as recited in claim 3 further comprising a first diode coupled between said first end and said first switch, a second diode coupled between said first end and said bus, a third diode coupled between said second end and said second switch, and a fourth diode coupled between said second end and said bus.

5. A method for controlling a power supply circuit having an upper inverter circuit, a first lower inverter circuit, and a second lower inverter circuit, said first lower inverter circuit and said second lower inverter circuit coupled to the upper inverter circuit, said method comprising the steps of:

alternatively operating a first switch and a second switch of the upper inverter circuit, wherein said first switch and said second switch are coupled to a respective first end and a respective second end of a first primary winding and said first switch and said second switch are coupled to a respective third end and a and a respective fourth end of a second primary winding;

electrically isolating said the first primary winding and the second primary winding;

controlling a first lower inverter circuit using a first output signal of a pulse width modulating circuit, said first output signal having a first duty cycle;

increasing the first duty cycle to attain a first predetermined voltage;

controlling a second lower inverter circuit using a second output signal of a pulse width modulating circuit, said second output signal having a second duty cycle; and increasing the second duty cycle to attain a second predetermined voltage independent of the first predetermined voltage.

6. A method as recited in claim 5 further comprising the step of rectifying the output of the first inverter circuit independently from the output of the second lower inverting circuit.

7. A method as recited in claim 5 further comprising the step of coupling a first switch and second switch of the first upper inverter circuit to an input line of a bus and to a primary winding of a first transformer.

8. A method as recited in claim 7 further comprising the step of alternately operating said first switch and said second switch.

9. A method as recited in claim 5 further comprising the step of coupling a third and fourth switch of a first lower inverter circuit to a return line of a bus and to a first primary winding of a first transformer and coupling a third and fourth switch of a second lower inverter circuit to a return line of a bus and to a second primary winding of a second transformer.

10. A method as recited in claim 9 further comprising the step of coupling a third and fourth switch of a first lower inverter circuit and a third and fourth switch of a second lower inverter circuit to a pulse width modulator.

* * * * *